United States Patent

[11] 3,583,493

| [72] | Inventor | Edwin Frank Wadelton<br>Corona Del Mar, Calif. |
|---|---|---|
| [21] | Appl. No. | 820,218 |
| [22] | Filed | Apr. 29, 1969 |
| [45] | Patented | June 8, 1971 |
| [73] | Assignee | Deere & Company<br>Moline, Ill. |

[54] LATCH MECHANISM FOR TWO-WAY PLOW
11 Claims, 5 Drawing Figs.

| [52] | U.S. Cl. | 172/225 |
|---|---|---|
| [51] | Int. Cl. | A01b 3/44 |
| [50] | Field of Search | 172/278,<br>229, 232, 207, 206, 208, 209, 210, 223, 224, 225,<br>226, 227 |

[56] References Cited
UNITED STATES PATENTS

| 721,545 | 2/1903 | Davis | 172/224 |
|---|---|---|---|
| 2,552,097 | 5/1951 | Kaltoft | 172/229 |
| 2,582,337 | 1/1952 | Kaltoft | 172/229 |
| 2,625,091 | 1/1953 | Pursche | 172/206 |

*Primary Examiner*—Robert E. Pulfrey
*Assistant Examiner*—Ralph T. Rader
*Attorneys*—H. Vincent Harsha, Harold M. Knoth, William A. Murray and John M. Nolan ABSTRACT: On a roll-over-type plow, a latching device between the plow frame and the main frame in which the device includes a slidable latching element connected to a hydraulic cylinder which operates to roll the plow frame between its left- and right-hand positions. The latch element has a limited stroke whereby the hydraulic cylinder first moves the latch element the limit of its stroke for purposes of unlatching and then rotates the plow frame, and which, upon shifting the plow frame to its opposite position, then shifts the latch element into its latching position.

*INVENTOR.*
EDWIN F. WADELTON

LATCH MECHANISM FOR TWO-WAY PLOW

BACKGROUND OF THE INVENTION

It has heretofore been known to provide a roll-over-type plow in which there is a main frame with a fore-and-aft extending plow support portion and a plow frame that is rotatably carried on the support portion so that the plow frame may move the plows carried thereon to left- and right-hand positions. Normally, the plow frame is rotated by means of a hydraulic cylinder that extends and retracts to move the plow to and from its left- and right-hand positions. In some instances, the cylinder itself is utilized to hold the plow in its position and in other instances a separate locking means is provided to hold the plow in the position.

SUMMARY OF THE INVENTION

It is the primary object of the present invention to utilize the same hydraulic cylinder that rotates the plow frame on its main frame to also operate a latching mechanism which locks the plow frame in its left- and right-hand positions.

Specifically, it is proposed to provide a latching element that is movable or slidable on the plow frame into and out of a latching position in respect to latch retainers on transversely spaced portions of the main frame. The stroke of the latching element is limited by abutments on the plow frame. The element connected to the hydraulic cylinder that rotates the plow frame on the main frame. Thus, when the plow frame is in one position and the latch element is locked, initial movement of the hydraulic cylinder will shift the latch element the entire length of its stroke which is in an unlatched position and thereafter the cylinder will raise the plow frame. Upon the plow frame reaching the opposite position, the hydraulic cylinder will extend sufficiently to move the latch element to the opposite end of its stroke and into a latch retainer on the main frame.

DESCRIPTION OF THE PREFERRED EMBODIMENT

Figure 1:
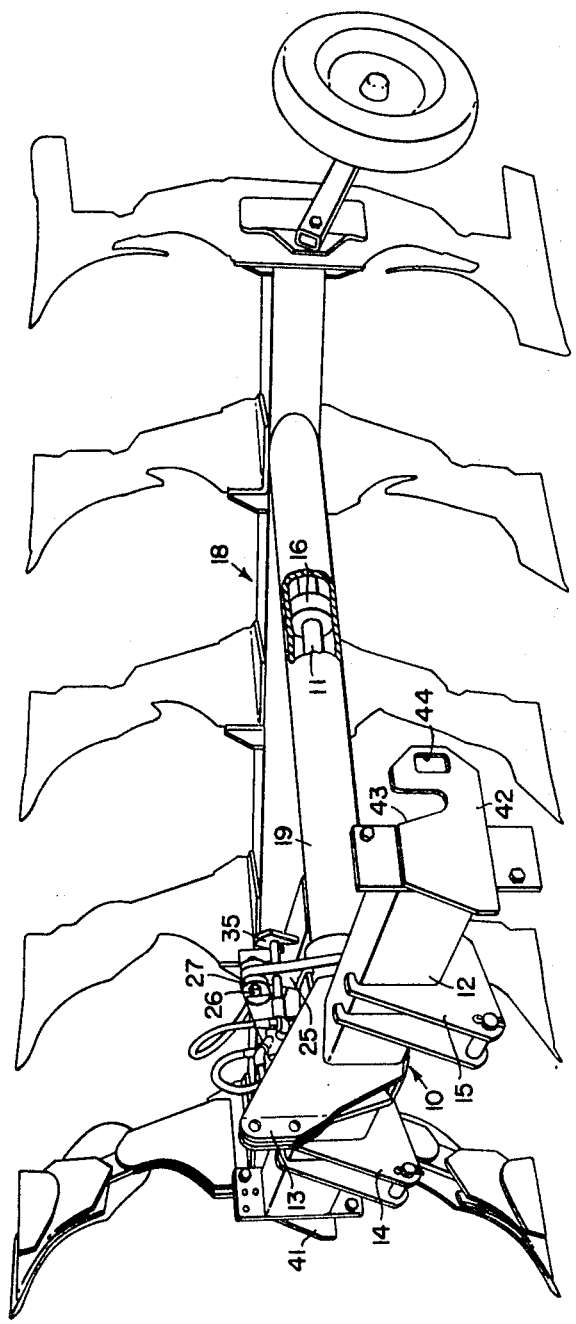
FIG. 1 is a side and slightly front perspective view of a roll-over-type plow using the latching mechanism of the present invention.
Figure 2:
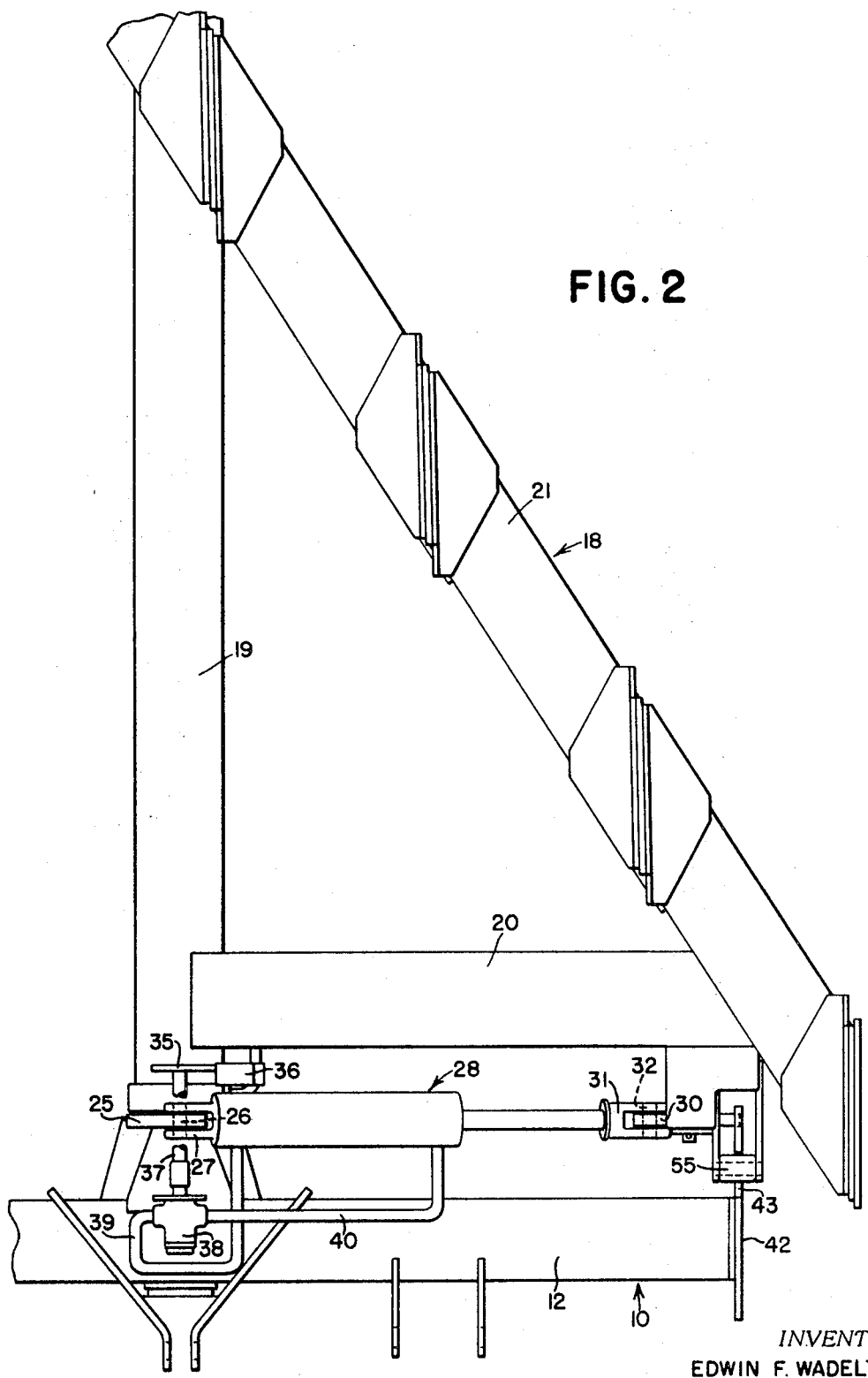
FIG. 2 is a plan view of the left-hand portion of the plow when it is in its left-hand position.
Figure 3:
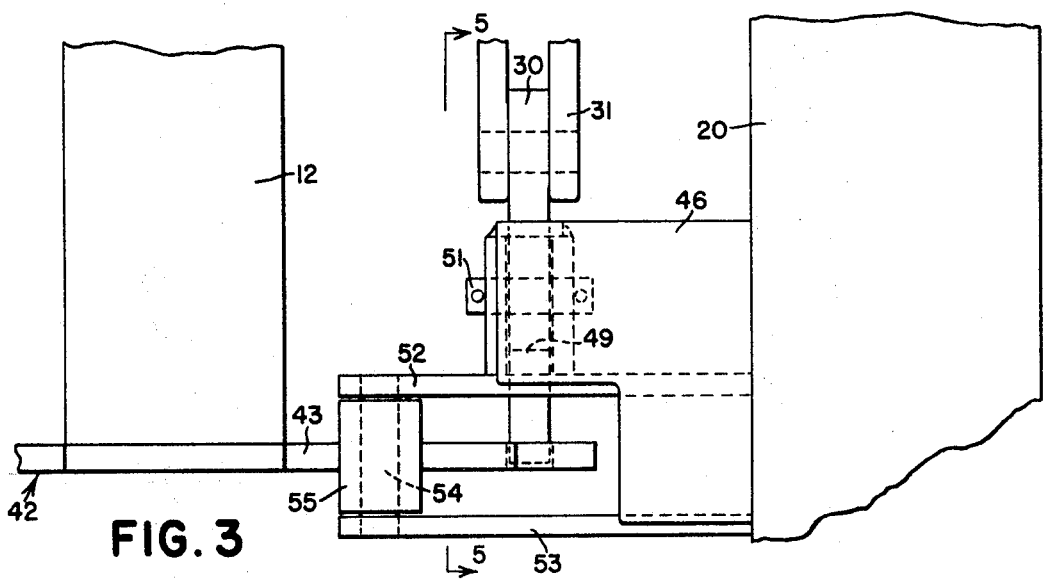
FIG. 3 is an enlarged plan view of the latching mechanism.

Referring now to FIG. 1, there is provided a main T-shaped frame 10 that includes a fore-and-aft central stem section or portion 11 and a front bar portion 12 projecting to opposite sides of the central portion 11. The bar portion 12 has a central mast and a pair of transversely spaced lower connecting bracket structures 14, 15 that are adapted for connection to a standard tractor hitch mechanism. Mounted on the central portion 11 are a series of axially spaced journals, one of which is shown at 16 that carry for rotational movement a triangular-shaped standard frame 18. One side 19 of the triangular-shaped standard frame is a tubular portion adapted to swivel on the journals 16 and a second side 20 projects transversely from the forward end of the tubular portion 19 and directly behind the bar portion 12. The outer end of the transverse portion 20 and the rear end of the tubular portion 19 are interconnected by a plow carrying portion 21 extending diagonally along the hypotenuse of the triangle. As is clearly apparent, the entire frame 18 may swing on the central portion 11 between a right-hand plowing position, as shown in FIG. 1, and a left-hand plowing position as shown in FIG. 2.

On the central portion of the main frame 10 is an upward transversely extending plate or bracket 25 having a pivot pin 26 at its upper end that projects through a yoke-type connection at the end of a hydraulic cylinder 28. The hydraulic cylinder extends transversely from the bracket 25 to a second bracket 30 on the outer end of the transverse frame portion 20. A suitable yoke 31 is provided on the piston end of the cylinder 28 and is connected to the bracket 30 by means of a pin 32. Thus, as the cylinder 28 extends or retracts, it forces the frame 18 to shift or rotate about the axis of the main frame portion 11. Just rearwardly of the bracket 25 is a rotary selector cam 35 which is positioned in alignment with a block 36 fixed to the frame portion 20. The cam 35 is carried on a shaft 37 adapted to rotate or rock on the bracket 25 and extend into a valve mechanism, indicated in its entirety by the reference numeral 38. The valve mechanism has hoses 39, 40 extending to opposite ends of the cylinder 28. The entire cam mechanism and the controls for the valve 38 is best shown and described in U.S. Pat. 3,174,556 which issued to W. E. Knapp et al. on Mar. 23, 1965 and reference may be had to the patent for a full explanation of structure and operation. The purpose of the cam and valve mechanism is to reverse the flow of fluid as the hydraulic cylinder moves the frame over the vertical center of the frame part 11. Fixed to the opposite outer ends of the bar portion 12 are upright substantially identical fore-and-aft extending plates 41, 42. A portion of each plate 41, 42 projects forwardly of the frame part 12 and has openings therein for receiving parking jacks when the plow is not in use. The plate 42 has a slot 43 opening upwardly and a vertically extending slot 44 that is closed at all sides. Fixed to the transverse frame portion 20 adjacent its outer end is a block structure 46 on which is carried the bracket 30. The bracket 30 is a latching element that is slidable through the block 46 for ingress and egress with respect to the closed slot or opening 44. The plates 41, 42 therefore operate as latch retainers for locking the frame 18 in its left- or right-hand position.

Figure 4:
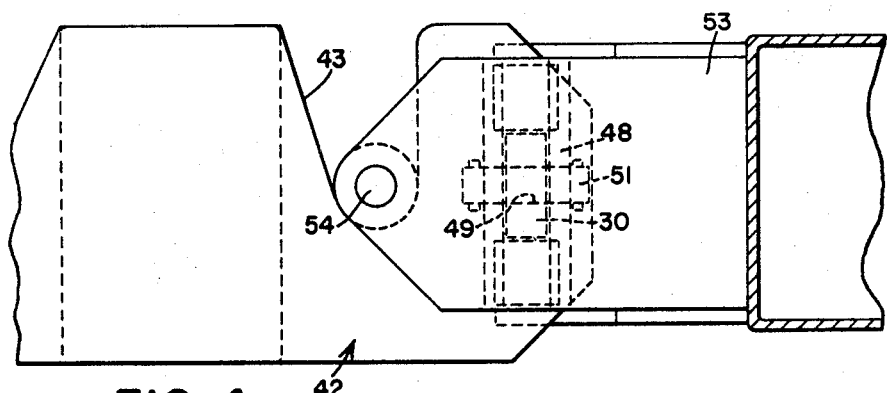
FIG. 4 is an end view of the latching mechanism.
Figure 5:
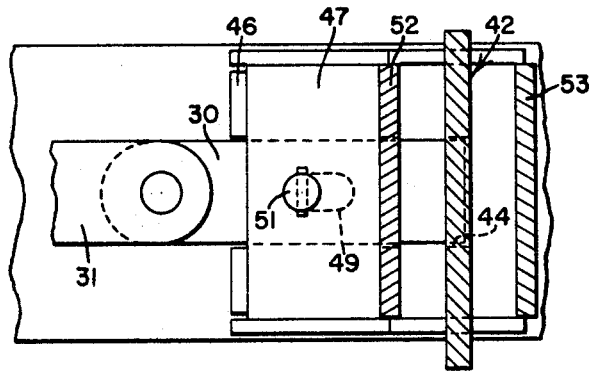
FIG. 5 is a sectional view taken substantially along the line 5–5 of FIG. 3.

The block structure 46 is closed on opposite sides of a bracket or latch element 30 by upright plates 47, 48. The latch element 30 has a horizontal elongated slot 49. The bracket or latch element 30 is connected to the plates by means of a pin 51 that projects through the slot. Therefore, unless otherwise restricted, the pin 51 may move lengthwise in the slot 49. The frame portion 20 is also provided with a pair of rigidly projecting transversely spaced plates 52, 53 that carries a pin 54 at their forward ends with a rotor 55 carried thereon. As may be seen clearly from reviewing FIG. 4, the roller engages the edges of the upwardly opening slot 43 and guides the plow frame in its descent so that the latch element 30 may be in registry with the latch retainer or slot 44.

In operation, and assuming the latch element 30 is in its latched position as shown in FIGS. 2—5, if it is desired to reverse the position of the plow, the hydraulic cylinder 28 is retracted. Upon retraction, the initial effect is to move the latch element 30 horizontally until the latch element 30 has obtained its maximum horizontal stroke which occurs when the pin 51 is at the outer most end of the slot 49. At this time, further retraction of the hydraulic cylinder 28 will cause the plow frame 18 to raise and to move over the vertical position. As the frame moves adjacent its vertical position, the cam 35 is adjusted to reverse the flow of fluid in the valve 38 so as to begin to extend the hydraulic cylinder 28. While the cylinder 28 is permitted to extend, it does in fact operate as a brake to the gravitational descent by the frame 18 as the latter moves toward the bracket 41. Since, however, the hydraulic cylinder does operate as a brake, as the plow frame 18 descends, it will tend to retain the pin 51 in the radially outer end of the slot 49. Thus, as the plow frame 18 moves to its opposite position or enters into a position adjacent the plate 41, the latching element 30 is retracted to permit the end thereof to pass alongside the plate 41 and to come into registry with the slot 44 at that end. Since the fluid in the hydraulic cylinder 28 is forcing it to extend, once the plow frame 18 has reached its opposite plowing position, the latch element 30 will automatically be inserted into the slot 44 in the bracket 41.

I claim:

1. On a roll-over-type plow that includes a T-shaped main frame having a transversely extending bar portion and a central fore-and-aft extending portion; a rigid plow frame having a plow carrying portion extending diagonally in respect to the fore-and-aft direction of travel and being rotatably supported on the fore-and-aft extending portion to move between left- and right-hand positions; a latching device composed in part of a pair of latch retainers on the bar portion on opposite sides of the fore-and-aft extending portion, and a latch element mounted on the plow frame for registry with the respective retainers upon the plow frame being in its respective left- and right-hand positions, the latching element being shiftable on the plow frame to move in opposite directed strokes between latched and unlatched positions in respect to a retainer in registry therewith; and a transverse extensible and retractable link on the main frame operatively connected to the latch element and adapted in movement in one direction to first shift the latch element the limit of its stroke to unlatch the latch element and to then raise the plow frame toward its opposite position, and in movement in the opposite direction to shift the latch element to its latched position after the plow is moved to said opposite position.

2. The structure as set forth in claim 1 in which the latch element is a bar mounted on the plow frame to shift radially with respect to the axis of rotation and the retainers are structures rigidly supported on the bar portion and having openings therein for receiving the ends of the bar upon it being shifted radially outwardly.

3. The structure as set forth in claim 2 in which the latch element is supported on the plow frame to shift radially and is retained thereon by a pin movable in a slot with the length of the slot determining the length of the opposite directed strokes.

4. The structure as set forth in claim 1 further characterized by the bar portion having upwardly opening guide means for receiving a part of said plow frame to guide the plow frame as it descends to its respective left- and right-hand positions and to move the latch element in registry with the respective retainers.

5. The structure as set forth in claim 4 in which the guide means and retainer on each side of the fore-and-aft extending portions are formed in a fore-and-aft plate structure with the guide means being an upwardly opening slot tapered to a small lower end adapted to receive a portion of the plow frame and the retainer is an opening in the plate adapted to receive the latch element upon said portion of the plow fame being seated in the lower end of the slot.

6. The structure as set forth in claim 5 in which the latch element is supported on the plow frame to shift radially, and there are limit means between the plow frame and element for limiting the distance of shifting and the length of the opposite directed strokes is in accordance with said distance.

7. The structure as set forth in claim 5 in which the latch element is rigid and is supported for sliding radial movement on the plow frame and for movement into and out of the opening, and there is provided a pin and slot joint between the member and plow frame for limiting the movement of the element.

8. The structure as set forth in claim 7 in which the extensible and retractable link means is a hydraulic cylinder having one end connected to the latch element and the other end to the main frame and whereby retraction of the cylinder will first retract the latching element from the opening and will then shift the plow vertically.

9. On a roll-over-type plow that includes a T-shaped main frame having a transversely extending bar portion and a central fore-and-aft extending portion; a triangular-shaped rigid plow frame including on one side a tubular portion supported for rockable movement on the fore-and-aft extending portion of the main frame, on a second side a rigid forward portion projecting substantially at right angles from the tubular portion to an outer end shiftable to opposite sides alongside the bar portion of the T-shaped main frame, and on a third side a plow carrying portion extending diagonally between the rear end of the tubular portion and the outer end of the forward portion, the plow carrying portion being rockable on the fore-and-aft extending portion between left- and right-hand positions; a latching device composed in part of a pair of plates on the bar portion on opposite sides of the fore-and-aft extending portion and positioned to be adjacent respectively of the outer end of the forward portion when the plow is in its left- and right-hand positions, said plates having latch receiving openings therein, and a latching element mounted on the second side for registry with the respective openings upon the plow frame being in its respective left- and right-hand positions, the latching element being shiftably mounted for transverse movement on the plow frame to move between latched and unlatched positions in respect to an opening in registry therewith; and an extensible and retractable hydraulic motor connected to the main frame and latch element and adapted when retracted to first retract the latch element from the respective opening and to then raise the plow frame toward its opposite position, and when extended to accommodate seating of the plow in said opposite position and then to shift the latch element into its latched position in respect to the opening of the respective plate.

10. The structure as set forth in claim 9 in which the plates have upwardly opening tapered slots and the plow frame has complementary guides for the slots so as to guide the plow frame in its descent to align the latch elements in respect to the openings of the respective plates.

11. On a roll-over-type plow that includes a T-shaped main frame having a transversely extending bar portion and a central fore-and-aft extending portion; a triangular-shaped rigid plow frame including on one side a tubular portion supported for rotational movement on the fore-and-aft extending portion of the main frame, on a second side a rigid forward portion projecting substantially at right angles to the tubular portion and shiftable to opposite sides alongside the bar portion of the T-shaped main frame, and on a third side a plow carrying portion extending diagonally between the rear end of the tubular portion and the outer end of the forward portion, the plow frame being shiftable on the fore-and-aft extending portion between left- and right-hand positions; a latching device composed in part of a pair of retainers on the bar portion on opposite sides of the fore-and-aft extending portion, and a latch element mounted on the second side for registry with the respective retainers upon the plow frame being in its respective left- and right-hand positions, the latch element being shiftably mounted on the plow frame to move in opposite directed strokes between latched and unlatched positions in respect to a retainer in registry therewith; and a transverse extensible and retractable link means between the main frame and latch element adapted in movement in one direction to first shift the latch element the limit of its stroke to unlatch the latch element and to then raise the plow frame toward its opposite position, and in movement in the opposite direction to first accommodate the seating of the plow in said opposite position and then to shift the latch element to its latch position.